(12) United States Patent
Meintschel et al.

(10) Patent No.: US 8,765,288 B2
(45) Date of Patent: Jul. 1, 2014

(54) INDIVIDUAL CELL FOR A BATTERY AND METHOD FOR THE PRODUCTION THEREOF

(75) Inventors: Jens Meintschel, Bernsdorf (DE); Dirk Schroeter, Winnenden (DE)

(73) Assignee: Daimler AG, Stuttgart (DE)

( * ) Notice: Subject to any disclaimer, the term of this patent is extended or adjusted under 35 U.S.C. 154(b) by 1005 days.

(21) Appl. No.: 12/672,171

(22) PCT Filed: Jul. 29, 2008

(86) PCT No.: PCT/EP2008/006229
§ 371 (c)(1),
(2), (4) Date: Jan. 19, 2011

(87) PCT Pub. No.: WO2009/018942
PCT Pub. Date: Feb. 12, 2009

(65) Prior Publication Data
US 2011/0117418 A1    May 19, 2011

(30) Foreign Application Priority Data

Aug. 6, 2007 (DE) .......................... 10 2007 036 849
Dec. 20, 2007 (DE) .......................... 10 2007 063 181

(51) Int. Cl.
*H01M 10/02* (2006.01)
*H01M 10/04* (2006.01)
*H01R 43/02* (2006.01)

(52) U.S. Cl.
USPC .............................. 429/153; 29/623.1; 29/879

(58) Field of Classification Search
None
See application file for complete search history.

(56) References Cited

U.S. PATENT DOCUMENTS

| | | | |
|---|---|---|---|
| 5,871,861 A | 2/1999 | Hirokou et al. | |
| 6,225,778 B1 | 5/2001 | Hayama et al. | |
| 6,387,566 B1 | 5/2002 | Chang et al. | |
| 6,406,815 B1 | 6/2002 | Sandberg et al. | |
| 6,743,546 B1 * | 6/2004 | Kaneda et al. | 429/127 |
| 6,767,666 B2 | 7/2004 | Nemoto et al. | |
| 2002/0136944 A1 | 9/2002 | Nemoto et al. | |
| 2002/0146620 A1 * | 10/2002 | Connell | 429/161 |
| 2005/0026014 A1 * | 2/2005 | Fogaing et al. | 429/26 |
| 2006/0040176 A1 | 2/2006 | Ling et al. | |
| 2006/0166053 A1 * | 7/2006 | Badding et al. | 429/13 |
| 2007/0048613 A1 | 3/2007 | Yanagida et al. | |

FOREIGN PATENT DOCUMENTS

| | | |
|---|---|---|
| CN | 1281265 A | 1/2001 |
| DE | 101 05 877 A1 | 8/2001 |
| EP | 1 202 371 A1 | 5/2002 |

(Continued)

OTHER PUBLICATIONS

German Office Action dated May 28, 2010 (6 [pages]).

(Continued)

*Primary Examiner* — Patrick Ryan
*Assistant Examiner* — Christopher Domone
(74) *Attorney, Agent, or Firm* — Crowell & Moring LLP

(57) ABSTRACT

An individual cell for a battery comprises an electrode stack disposed within a cell housing and a method for the production thereof. The individual electrodes, preferably electrode foils, are electrically connected to lead vanes, and at least electrodes of different polarity are separated and insulated from each other by a separator preferably a separator foil. Lead vanes of the same polarity are electrically connected to each other to form a pole. The lead vanes of a pole are electrically compressed with each other and/or welded to each other.

16 Claims, 3 Drawing Sheets

(56) References Cited

FOREIGN PATENT DOCUMENTS

| JP | 61-126765 | A | 6/1986 |
| JP | 5-109400 | A | 4/1993 |
| JP | 9-82305 | A | 3/1997 |
| JP | 2002-75324 | A | 3/2002 |
| JP | 2002-190295 | A | 7/2002 |
| JP | 2002-352863 | A | 12/2002 |
| JP | 2004-31272 | A | 1/2004 |
| JP | 2006-40694 | A | 2/2006 |
| JP | 2006-164922 | A | 6/2006 |
| JP | 2008-16368 | A | 1/2008 |
| JP | 2009-245709 | A | 10/2009 |

OTHER PUBLICATIONS

International Search Report dated Nov. 25, 2008 and translation of relevant portions thereof; (16 pages).
Japanese Office Action with English translation thereof Dated Feb. 26, 2013 {Six (6) Pages}.
Japanese Office Action dated Aug. 1, 2012 (four (4) pages).
English translation of Chinese Office Action dated Mar. 28, 2012 (Six (6) pages).
Japanese Office Action dated Jan. 14, 2014 (three (3) pages).

* cited by examiner

INDIVIDUAL CELL FOR A BATTERY AND METHOD FOR THE PRODUCTION THEREOF

This application is a national stage of PCT International Application No. PCT/EP2008/006229, filed Jul. 29, 2008, which claims priority under 35 U.S.C. §119 to German Patent Application No. 10 2007 036 849.8, filed Aug. 6, 2007 and No. 10 2007 063.181.4, filed Dec. 20, 2007, the entire disclosures of which are herein expressly incorporated by reference.

BACKGROUND AND SUMMARY OF THE INVENTION

The present invention relates to an individual cell (and to a construction method therefor) for a battery having an electrode stack disposed inside a cell housing, with the individual electrodes (preferably electrode foils) being electrically connected to lead vanes, and at least electrodes of different polarities being separated and insulated from each other by a separator (preferably a separator foil). Lead vanes of the same polarity are connected to each other in an electrically conductive manner to form a pole. Such a battery (and method) may, for example, be used in energy technology, especially in battery-operated vehicle technology.

Especially with lithium ion cells for mild hybrid vehicles, which are designed as flat cells in a sensible manner, aluminum and copper foils coated with electrochemically effective materials are used as electrode foils. The electrode foils are stacked on top of each other to form an electrode stack, wherein the individual electrode foils are separated from each other electrically and also spatially by a separator, preferably also formed as a foil. The contacting of an electrode foil to the outside takes place by means of a lead vane welded to the electrode foil, which has to be guided through the cell housing. As the cell housing of an individual cell is usually formed of metal, preferably aluminum, the lead vanes have to be insulated electrically amongst others in the feedthrough region. The tightness of the cell housing in the feedthrough region can only be manufactured with difficulty and very elaborately. This problem relates to the compression strength and also the sealing against humidity. Thus, the entry of humidity is still a very difficult problem, which can only be solved in a very elaborate manner.

One object of the present invention, therefore is to provide an improved individual cell for a battery and an improved method for its production, which especially overcome the disadvantages given in the state of the art and that the production costs are reduced as much as possible.

This and other objects and advantages are achieved by the cell structure and method according to the invention, in which electrical poles can be guided from the interior of the individual cell to the outside by contacting between the lead vanes of the electrode foils of individual cells of a battery, without elaborate sealing measures. The contacting thereby especially takes place by means of welding an associated outer side, so as to contact the interior electrode foils with the outside.

In a special manner, a peripheral (edge) region of the respective electrode foil guided to the outside of the electrode stack is used as the lead vane, whereby complex contacting of electrode foil and lead vane is unnecessary. This type of contacting is at the same time very safe against at least many, especially outer influences such as impacts or vibrations.

In a special manner, especially with bipolar individual cells, the contacting takes place directly to the opposite outer, especially flat sides of the cell housing, wherein these outer, especially flat sides are electrically insulated with regard to each other. In this manner, lead vanes of one polarity are welded and/or compressed directly to an outer side, preferably a flat side of the cell housing, especially a flat cell, wherein the outer sides of different polarity are electrically insulated from each other.

By an arrangement of the electrode stack with a frame running circumferentially around the edge, which is especially electrically insulating, an additional insulating arrangement can be saved in an advantageous manner. The manageability of the individual cell is further eased or designed in a safer manner.

In a further development of the invention, a frame running circumferentially around the edge, and which is electrically insulating, is arranged between two electrically conducting flat sides of the cell housing, which frame has two material recesses electrically insulated from each other and spaced from each other. The lead vanes of one polarity are arranged in these material recesses. In an advantageous manner, the clear height measured in the direction of the stacking of the electrodes of a material recess is smaller or the same as the corresponding extension of the associated lead vanes stacked above each other in an uninfluenced manner, and their depth measured parallel to the flat side of an electrode foil is larger or the same as the corresponding extension of the associated lead vanes. The lead vanes are hereby held securely in the material recesses and can be compressed with these in an electrically conductive manner with an especially tight connection between the frame and the outer/flat sides.

According to a further advantageous embodiment of the invention, the electrical connection between the cell housing and a "+" or "−" pole at the electrode stack is only produced during and especially after the assembly of the cell housing, and namely from the outside by a welding and/or compressing method, in a preferred manner by means of a laser beam welding method.

In a preferred manner, the housing wall of the respective outer side and further in the depth, the lead vanes of the electrode stack are partially melted on during a welding method, whereby a material-fit connection can be produced.

According to further an advantageous development of the invention, a weld seam comprises, seen in the direction of the stacking of the electrodes, all lead vanes or passes through these.

According to a further development of the invention, a weld seam comprises, seen in the direction of the stacking of the electrodes, not only all lead vanes, but also the corresponding electrically conductive outer side of the cell housing of the individual cell or passes through it.

In an advantageous further development, the connection of the corresponding flat side of the cell housing, especially of an aluminum housing with a copper foil as a pole, can be improved by inserting a foil of additional material, e.g. nickel.

According to an advantageous further development of the invention, poles are only switched to the corresponding outer sides with a final welding process taking place on corresponding outer sides, especially flat sides of the cell housing.

By one or more of the mentioned measures, it is possible to simplify the construction of a cell housing with an inexpensive production, to increase the safety against vibration and thus the stability, the durability, and thereby again also the usage diversity, to enable a good installation space usage within a battery box, especially also through the contacting positions which are now possible. The failure rate is also reduced by the simplified contacting method. Furthermore, by the simple contacting at the closed individual cell, their production is eased considerably. Furthermore, the current capacity is improved by the material-fit contacting of the lead vanes. A weakening of the pressure tightness of the cell housing of the individual cell is also not present, as no contact feedthrough of the poles takes place. The improvement of the tightness of the interior of the cell housing with regard to the entrance of humidity is also connected directly hereby.

Other objects, advantages and novel features of the present invention will become apparent from the following detailed description of the invention when considered in conjunction with the accompanying drawings.

DETAILED DESCRIPTION OF THE DRAWINGS

Figure 1:
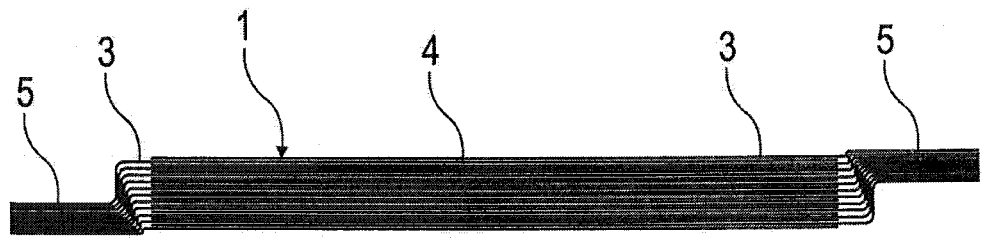
FIG. 1 is a schematic sectional view of an electrode stack of a flat cell.

Corresponding parts are provided with the same reference numerals in all figures.

FIG. 1 represents a sectional view of an electrode stack 1 of a flat cell 2 shown in FIGS. 5 to 8 in more detail. Electrode foils 3 of different polarity are stacked above each other in a center region (especially aluminum and/or copper foils and/or foils of a metal alloy), and are insulated electrically from each other by a separator 4, especially a separator foil.

In an edge region of the electrode foils 3 via the lead vanes 5, projecting over the center region of the electrode stack 1, electrode foils 3 with the same polarity are electrically connected to each other. The lead vanes 5 are thereby electrically compressed with each other and/or welded to each other and form the poles of the electrode stack 1.

Figure 2:
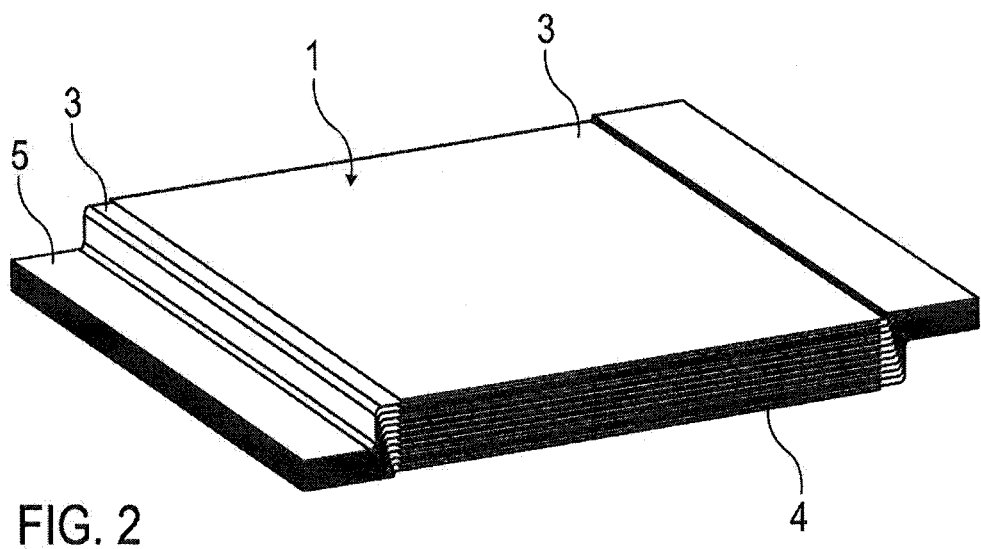
FIG. 2 is a schematic perspective view of an electrode stack of a flat cell according to FIG. 1.

FIG. 2 shows the electrode stack 1 of the flat cell 2 according to FIG. 1 in an entire view.

Figure 3:
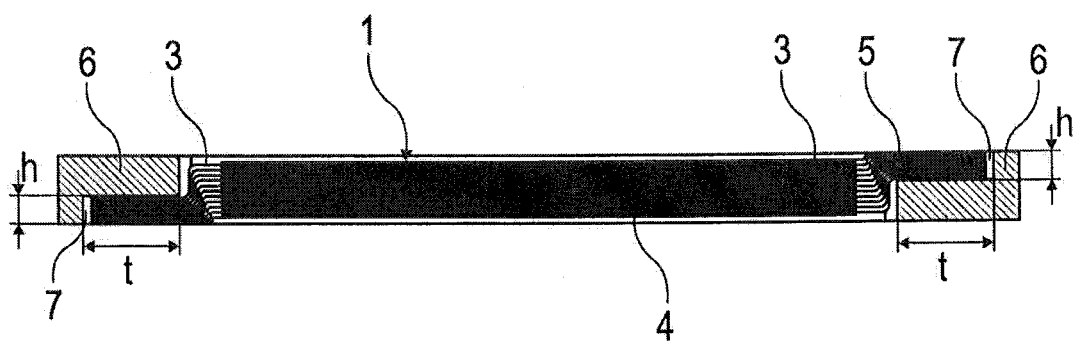
FIG. 3 is a schematic sectional view of an electrode stack according to FIG. 1, which is arranged in a frame.

FIG. 3 shows a sectional depiction of the electrode stack 1 according to FIG. 1, wherein the electrode stack 1 is arranged in a frame 6 running around the periphery of the electrode stack 1 on the edge side. This frame 6 has two material recesses 7 spaced from each other, which are thereby formed in such a manner that the poles formed by the lead vanes 5 are arranged in the material recesses 7. The clear height h of the material recesses 7 is formed in such a manner that it is less than or equal to the corresponding extension of the lead vanes stacked without influence above each other. The depth t of the material recesses 7 corresponds to the corresponding extension of the lead vanes 5 or is formed larger than this. The frame 6 is preferably manufactured of an electrically insulating material, so that the poles with different polarity formed by the lead vanes 5 are electrically insulated from each other and additional arrangements for an electrical insulation can be foregone in an advantageous manner.

Figure 4:
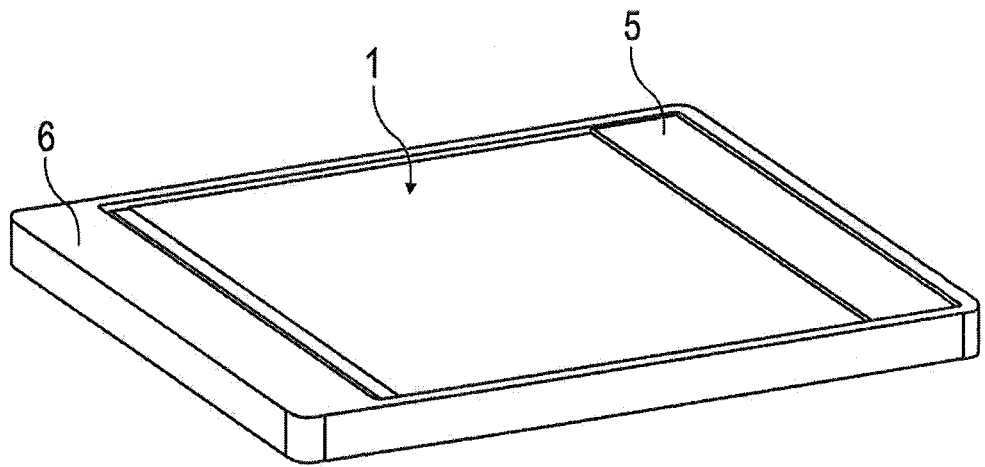
FIG. 4 is a schematic perspective view of the electrode stack arranged in the frame according to FIG. 3.

FIG. 4 is a perspective view of the electrode stack 1 arranged in the frame 6 according to FIG. 3.

Figure 5:
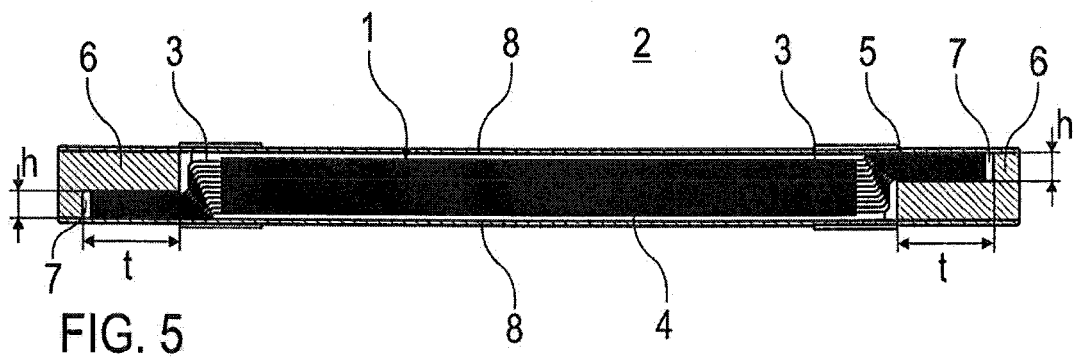
FIG. 5 is a schematic sectional view of the electrode stack according to FIG. 3 arranged in the frame with two flat sides arranged at the frame.

FIG. 5 is a sectional view of the electrode stack 1 according to FIG. 3 arranged in the frame 6, wherein two flat sides 8 are arranged at the frame 6. A fastening of the flat sides 8 takes place in a manner not shown in detail by means of adhering and/or seaming of the flat sides 8 in a circumferential recess in the frame 6, not shown in detail. The frame 6 and the flat sides 8 thereby form a cell housing for protection of the electrode stack 1 from entering particles, humidity, and from mechanical influences on the electrode stack 1.

The poles formed of the lead vanes 5 are thereby pressed against the flat sides 8, so that an electrical potential of the lead vanes 5 is applied to the flat sides 8, which are insulated electrically from each other by means of the frame 6.

In a further development of the invention, a foil (not shown in detail), which is e.g., manufactured of nickel, can additionally be introduced between the poles (which are e.g., manufactured of copper), and the flat sides 8, which are e.g., manufactured of aluminum, to achieve an improved connection between the poles and the flat sides 8.

Figure 7:
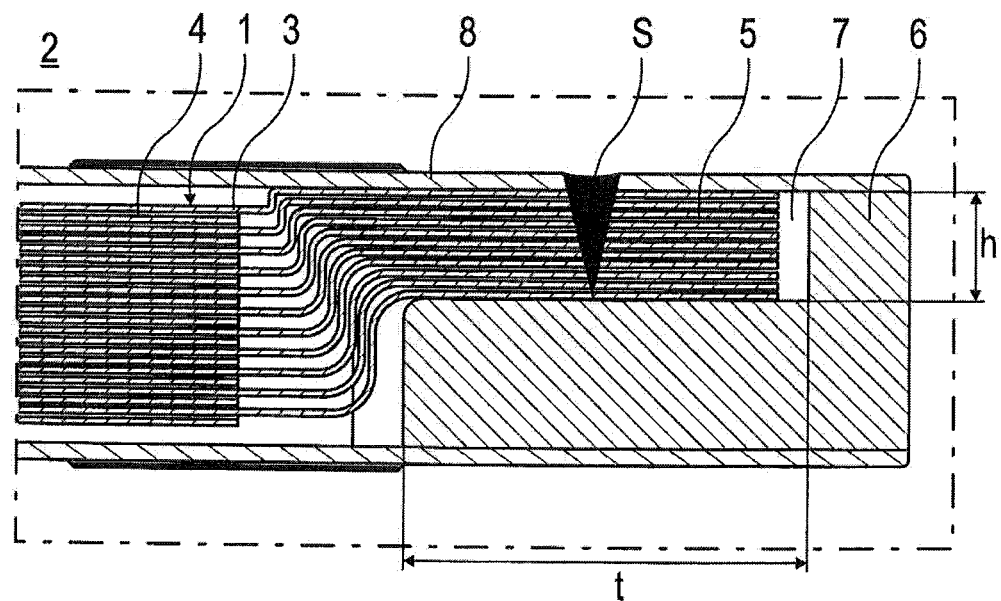
FIG. 7 is a schematic enlargement of the edge region of the electrode stack arranged in the frame with two flat sides arranged at the frame according to FIG. 6 and an introduced weld seam.

In one arrangement of the invention, it is further possible to arrange an electrically insulating foil (not shown in detail) between the poles and the flat sides 8, or to arrange the flat sides 8 on one side with an electrically insulating layer, so that an electrical contacting of the poles with the flat sides 8 only results with a welding of the flat sides 8 with the poles, as shown in FIG. 7.

Figure 6:
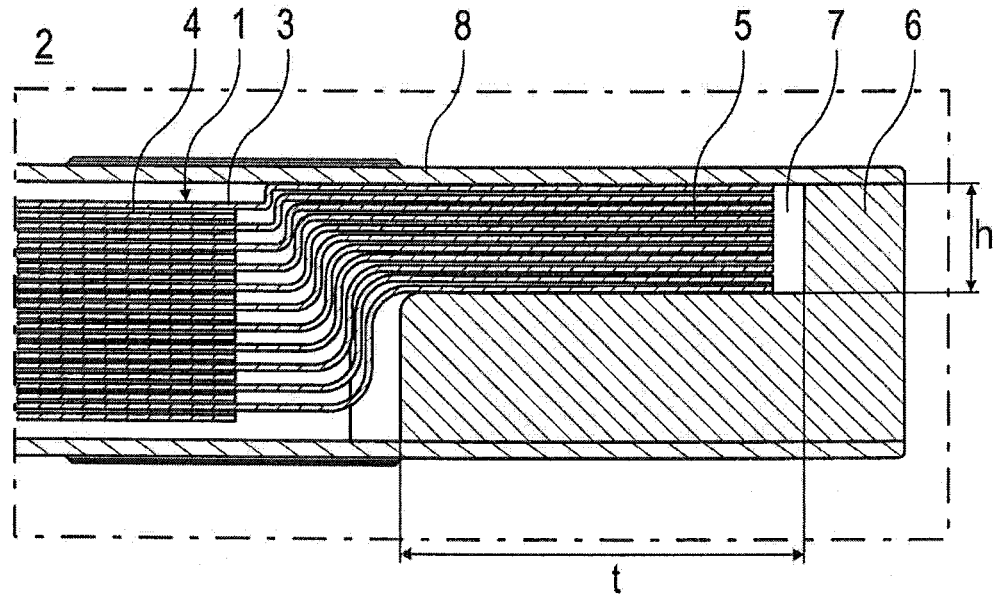
FIG. 6 is a schematic enlargement of an edge region of the electrode stack arranged in the frame with two flat sides arranged at the frame according to FIG. 5.

FIG. 6 is an enlargement of an edge region of the electrode stack 1 arranged in the frame 6 with two flat sides 8 arranged at the frame according to FIG. 5.

FIG. 7 is an enlargement of the edge region of the electrode stack 1 arranged in the frame 6 with two flat sides 8 arranged at the frame 6 according to FIG. 6. A weld seam S is thereby brought into the poles formed by the lead vanes 5 by means of, for example, a laser beam or another welding method in such a manner from the outside through the flat side 8 in the direction of the stacking of the electrode foils 3, that a material-fit connection and thus an electrical contacting between the flat sides 8 and the associated poles results by a partial melting of the materials of the flat sides 8.

The weld seam S is introduced with compressed and also with welded lead vanes 5 according to FIG. 1 and independently of the arrangement of an electrically insulating foil between the poles and the flat sides 8 according to FIG. 5 for the electrical contacting of the poles with the flat sides 8, to ensure a stable current capacity through the material-fit connection and a fixing of the electrode stack 1 in the interior of the cell housing.

Figure 8:
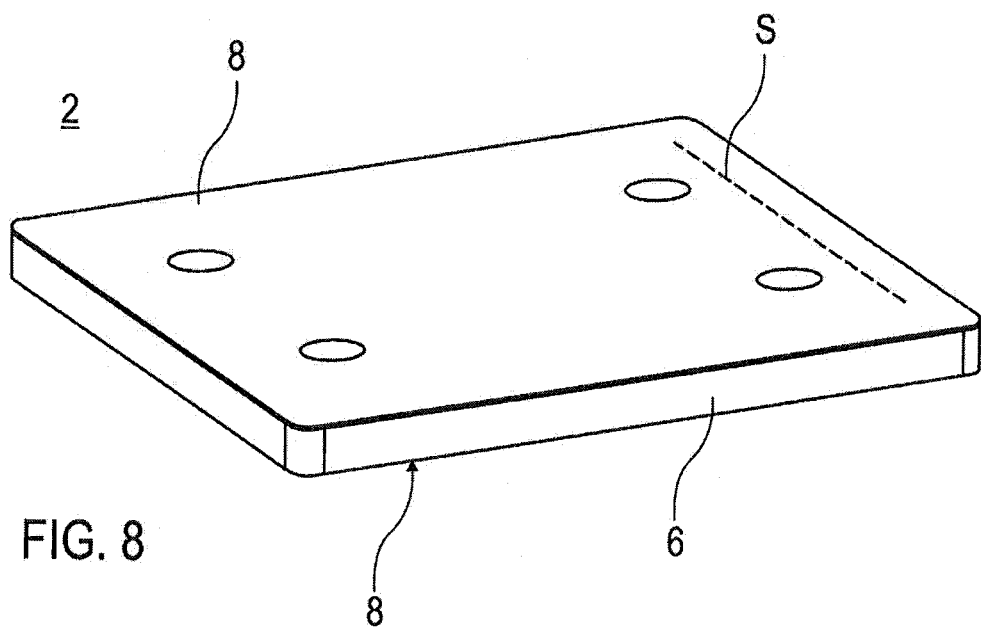
FIG. 8 is a schematic perspective view of a flat cell.

FIG. 8 is a perspective view of the flat cell 2, wherein the arrangement of the weld seam 9 is shown schematically by means of a dashed line. For the material-fit connection of the flat sides 8 and the poles, several locally arranged weld seams S can also be used in a further development of the invention alternatively to the continuous weld seam S, or one or several weld points, not shown in detail, can be brought into the poles formed by the lead vanes 5 from the outside through the flat side in the direction of the stacking of the electrode foils.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An individual cell for a battery having an electrode stack disposed inside a cell housing, whose individual electrodes are electrically connected to lead vanes, wherein:
at least electrodes of different polarities are separated and insulated from each other by a separator;
lead vanes of the same polarity in said individual cell are electrically connected to each other manner to form a pole;
the lead vanes of a pole are electrically connected by one of being compressed with each other and being welded to each other;
a lead vane comprises a distal end of a respective electrode foil that is guided to the outside of the electrode stack; and
the cell housing has two electrically conductive flat sides and an electrically insulating frame arranged therebetween running circumferentially on the distal end.

2. The individual cell according to claim 1, wherein:
said individual electrodes comprise electrode foils; and
an electrode foil comprises one of a copper, an aluminum foil, and a foil of such an alloy.

3. The individual cell according to claim 1, wherein:
the frame has two material recesses insulated and spaced from each other, in which material recesses the lead vanes of a respective polarity are arranged;
a clear height of a material recess, measured in a stacking direction of an electrode foil, is less than or equal to a corresponding extension of the associated lead vanes stacked on top of each other in an uninfluenced manner; and
the depth of the stacked lead vanes measured parallel to a flat side of an electrode foil is greater than or equal to a corresponding extension of the associated lead vanes.

4. The individual cell according to claim 1, wherein:
the lead vanes of one polarity are electrically connected to an electrically conductive region of an outer side of the cell housing; and
two respective regions of different polarity are electrically insulated from each other.

5. The individual cell according to claim 4, wherein a region of different polarity is a flat side of a cell housing, of a flat cell.

6. The individual cell according to claim 1, wherein:
the lead vanes of one polarity are welded or compressed directly to a flat outer side of the cell housing; and
the outer sides of a different polarity are electrically insulated from each other.

7. The individual cell according to claim 1, wherein a weld seam seen in a stacking direction of the electrode foils comprises all lead vanes or passes through them.

8. The individual cell according to claim 1, wherein a weld seam seen in a stacking direction of the electrode foil, comprises all lead vanes and the corresponding electrically conductive outer side of the individual cell or passes through them.

9. A method for the production of an individual cell for a battery, in which an individual cell is arranged in an electrode stack within a cell housing, with individual electrodes, being electrically connected to each other with lead vanes, and separated from each other in an insulating manner by a separator, and with lead vanes of the same polarity being electrically connected to each other to form a pole;
said method comprising: connecting the lead vanes of a pole by one of electrically compressing them together, and welding them to each other, wherein
a distal end of a respective electrode foil which is guided to the outside of the electrode stack forms a lead vane; and
the cell housing has two electrically conductive flat sides, between which a frame is introduced, which runs circumferentially on the distal end and which is electrically insulating.

10. The method according to claim 9, wherein the electrode foil comprises one of a copper foil, an aluminum foil and a foil of an alloy.

11. The method according to claim 9, wherein:
two material recesses insulated and spaced from each other are brought into the frame;
lead vanes of one polarity are inserted into the material recesses;
a clear height of a material recess, measured in the direction of the stacking of the electrode foils, is less than or equal to a corresponding extension of the associated lead vanes stacked on top of each other in an uninfluenced manner; and
the depth of the stack of lead vanes, measured parallel to a flat side of an electrode foil is greater than or equal to a corresponding extension of the associated lead vanes.

12. The method according to claim 9, wherein:
lead vanes of one polarity are electrically connected to an electrically conductive region of an outer side of the cell housing; and
the respective two regions of different polarity are electrically insulated from each other.

13. The method according to claim 12, wherein a flat side of a cell housing is a region of different polarity.

14. The method according to claim 9, wherein:
the lead vanes of one polarity are welded and/or compressed directly to an outer side of the cell housing; and
the outer sides of different polarity are electrically insulated from each other.

15. The individual cell according to claim 1, wherein one of the following is true:
with a weld seam seen in the direction of the stacking of the electrode foils, all lead vanes are welded to each other at once; and
with a weld seam in the direction of the stacking of the electrode foils, all lead vanes are welded to each other through them.

16. The method according to claim 9, wherein one of the following is true:
with a weld seam seen in the direction of the stacking of the electrode foils, all lead vanes and the corresponding electrically conductive outer side of the individual cell are especially welded to each other at once; and
with a weld seam in the direction of the stacking of the electrode foils, all lead vanes and the corresponding electrically conductive outer side of the individual cell are welded to each other through them.

* * * * *